Figure 1:
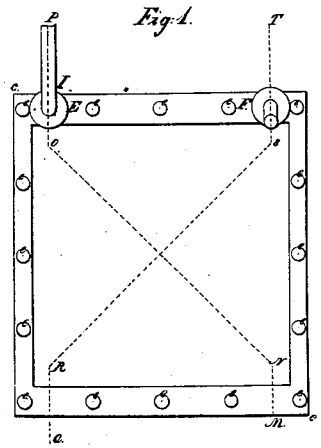

A. P. Dubrunfaut,
Defecating Cane Juice &c.

Nº 43,065.                                    Patented June 7, 1864.

Witnesses:                                    Inventor.

UNITED STATES PATENT OFFICE.

AUGUSTE PIERRE DUBRUNFAUT, OF BERCY, FRANCE.

IMPROVED PROCESS OF PURIFYING SACCHARINE LIQUIDS.

Specification forming part of Letters Patent No. 43,065, dated June 7, 1864.

*To all whom it may concern:*

Be it known that I, AUGUSTE PIERRE DUBRUNFAUT, of Bercy, in the Empire of France, have invented an Improved Method of and Apparatus for Treating Molasses, Sirups, Saccharine Juices, and other Products; and I hereby declare that the following is a full, clear, and exact description of the same, reference being had to the accompanying drawings.

This method of and apparatus for treating molasses, sirup, saccharine juices, and other products are based upon the phenomenon of endosmose—that is to say, the double current which exists between two liquids of different density separated by a membranous partition.

In the following description of the apparatus styled "osmogene" I use the expression "osmose" and the verb "to osmose" to express the action produced in the liquids under treatment. I mean by the expressions "osmosed" or "to be osmosed" the liquid placed in the inner reservoir or vessel, and by the expression "osmosing" the liquid in the outer reservoir or vessel.

By placing in the apparatus impure molasses, sirups, or saccharine juices in opposition with water they undergo an analysis such as organic and inorganic salts pass in exosmose waters to the almost complete exclusion of the sugar and coloring-matter. This effect is at its maximum when the molasses and sirups, highly saline, such as those from beet-root, are at their normal density 40° to 45° Baumé in presence of pure water. The analytical effect which eliminates the salts diminishes as the density of the molasses decreases and that of the water increases.

The apparatus shown by way of example in the accompanying drawings possesses the novel arrangement of the employment of vertical membranes whereby the surfaces may be indefinitely multiplied in a small space.

Before describing the arrangement shown in the drawings I will explain the chief features of the osmogene. The following is the simplest arrangement: Take, for example, a frame of cubical form, closed at bottom, provided at its four sides with paper, parchment, or other suitable membrane, and leave the top open. Place this apparatus in a reservoir a litttle larger than it in such manner that its top shall rise above the reservoir about three or four inches, and shall be raised at bottom about the same distance from off the bottom of the reservoir. Form in the cubical frame an overflow-orifice, and apply a pipe thereto, and to the lower part of the reservoir apply a siphon-tube, through which to draw the denser liquid and let it run off. This is a simple form of osmogene formed of two parts, one the osmosing reservoir or vessel, and the other the osmosed reservoir or vessel. If the two parts of this apparatus are charged with the osmosing-liquid and the liquid to be osmosed there will be a large surface of membrane, and the action will take place without difficulty. In proportion as the osmosed liquid absorbs water throughout the length of the vertical membranes the mixture rises to the surface on account of its less density, while the external water flows in an opposite direction. These two currents flow without any sensible mixing with the surrounding liquid masses. Fresh quantities of normal liquid are incessantly submitted to the action of the membranes, the analysis proceeds, and the drawing off of the liquids between which the greatest effect has been produced is easily effected. The osmosed liquid issues continously by the overflow-orifice, while the osmosing-liquid, which is supplied at the upper part by a continuous stream, renews that which has passed through the membranes and that which having accumulated at the bottom of the reservoir has acquired the required density, and is drawn off by the siphon-tube. The membranes may be applied in different ways. The most simple method consists in applying them by means of large stays and filling the joints with mastic, varnish, caoutchouc. They may be attached to the frames by materials which, like oil-varnish, are insoluble in water, and then be consolidated by rods and screws. The membranes may be interposed between two sheets of canvas or metallic sieves or gauze, which would preserve them from being injured or lengthened by the changes of pressure. This operation is supposed to be carried on intermittently. It is, however, better to work continously, which may be done by drawing off the osmosed and osmosing liquids. It is sufficient to lead the liquid to be osmosed in a continuous stream by a tube to the bottom of the reservoir in which it is to be osmosed. By easily-regulated cocks the densities required for the effects which it is wished to produce may be imparted to the liquids to be drawn off, and these densities may vary very considerably always under the condition of maintaining between the osmosing and osmosed liquids the inequalitiy of density or composition useful for the phenomenon of exosmose. This apparatus forms the basis of all the modifications about to be described. Thus, for example, by dividing the cubical frame into two compartments of equal capacity, the active surface of the membranes will be increased without altering the reservoir. By dispensing with two of the four lateral membranes of the cubical frame it may be transformed into a series of ten, twenty, one hundred, or even five hundred frames of variable thicknesses adapted to the liquids and the effects it is desired to obtain. As each frame may be provided at its two sides with membranes, the number of membranes will by this means be multiplied according to the number of frames into which the cubical frame is divided, and all will work in a reservoir of comparatively small size. This arrangement would only require the formation, in any suitable manner in the reservoir and between all the frames, of spaces or intervals sufficient to allow the osmosing liquid to flow between the membranes. Metal sheets or plates would answer the purpose. The supply to the reservoir is effected in the same manner as when the apparatus has only one compartment; but the supply to the frames must be modified. It is sufficient that all the tubes which supply the liquid to be osmosed to the frames be made to communicate with a principal pipe, furnished with a cock by which the flow may be regulated. The discharge from the frames may take place through a series of overflow-pipes, which empty themselves into a common channel or receiver.

The supply arrangements (shown in the accompanying drawings, and hereinafter described) may be fitted to an apparatus constructed as just described. The positions occupied by the two liquids may be reversed—that is to say, the liquid to be osmosed may be placed in the reservoir, and the osmosing-liquid may be made to circulate in the frames. The arrangements just described cause the liquid to be osmosed to take the form of thin layers circulating between two membranes in presence of two opposite currents of osmosing-liquid. These arrangements are admirably adapted to the system of continuous working, and realize in great perfection and with every desirable economy the analytical or other effects attainable from the osmose. By these means a very large acting surface may be formed in a comparatively small space, as a thousand square yards of surface may, if desired, be contained in a cubic yard.

In the preceding description I have supposed the employment of an osmosing-reservoir. The reservoir may, however, be entirely suppressed, and the apparatus may be reduced to the simple employment of frames, as about to be described. Take one hundred or two hundred frames, each about one-third of an inch thick, cover both sides with strong canvas previously washed and well stretched, then bring all the frames together in one pile, interposing between every two an active membrane. All the joints must be carefully made, and the whole is firmly secured by stays at the two ends connected by bolts. If this apparatus be placed so that the membranes are in a vertical position, and if it be charged by placing the osmosing-liquid and the liquid to be osmosed alternately in the contiguous frames, the same effects will be produced as in the reservoir before described. In this instance, however, the spaces or intervals which were provided by the reservoir are here formed by the frames themselves. Circulation takes place in the same manner—that is to say, that the two liquids are made to flow in contiuous streams in contrary directions, and in thin layers, so as to fulfill the conditions of working, which form the object of this invention.

The apparatus may also be used with the membranes in a horizontal position. In the two cases the analytical action of the frames works by addition—that is to say, it is equal to the effect of each frame multiplied by thier number. This effect may be utilized by multiplication—that is to say, the analyzing effect may be increased as well as the number of frames in the following manner: All the compartments of the same kind may be put in communication so as to cause the two liquids, the osmosing-liquid, and the liquid to be osmosed to circulate therein in two different directions, and from frame to frame. In this case, as the osmosed liquid is submitted successively to the action of all the membranes, it may more easily be reduced to the minimum density, while the osmosing-liquid may reach the maximum.

The objects above mentioned may also be attained by forming of paper or artificial membranes a sack or bag about a yard high, and of considerable length. This sack folded a number of times on itself in a reservoir, with a sieve interposed between every two folds, inside or outside the sack, will form an osmogene with large vertical surfaces. By charging the reservoir with water or the sack with liquid to be osmosed, or vice versa, an effect will be produced analogous to that obtained by the frames united in a reservoir. Large porous vases or simple cylindrical frames covered with a membrane, and united in a reservoir, will work in the same manner as the simple osmogenes first described.

All the operations before described may be carried on hot or cold, care being taken to heat or cool the liquids to the required temperature before being placed in the apparatus. The useful effect of the membranes usually increases with elevation in temperature. The presence of liquid columns may be applied to all the frames or to one part or other of the osmosing or osmosed frames. By this last method osmotic neutrality may be produced— that is to say, the resultant of the currents of endosmose may be counteracted by means of a liquid column, which would act as an equipoise to it. This manner of working, which does not interfere with the perfection of the analysis, allows of water and expense being economized by preventing the weakening of the osmosed liquid.

By apparatus constructed according to this invention osmotic analysis which hitherto has only been carried on in a laboratory, may be applied to manufactures.

Figure 2:
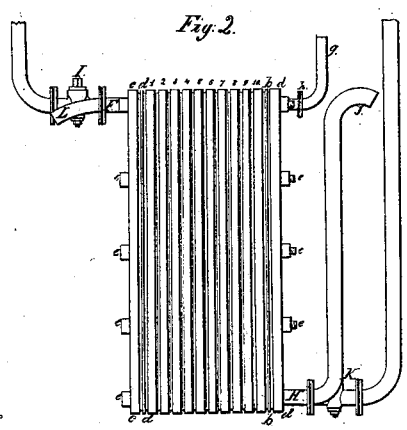
Figure 3:
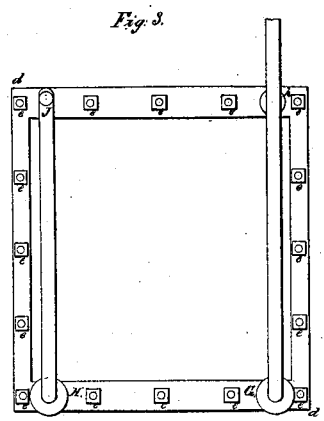
Figure 4:
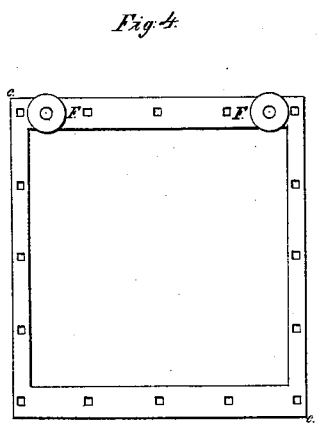
Figure 6:
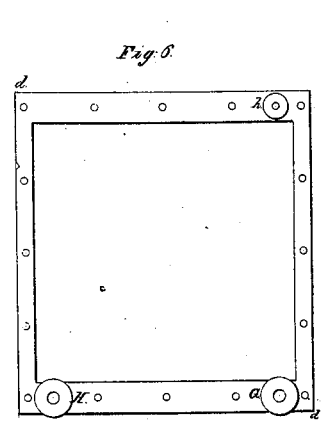
Figure 7:
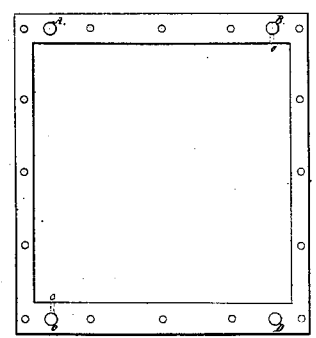
Figure 9:
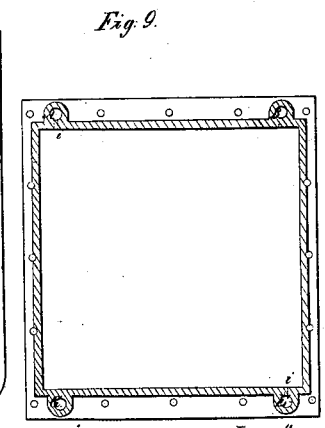

The apparatus represented in Figures 1, 2, and 3 consists of ten frames of wood, No. 1 to No. 10, similar to that shown in front view at Fig. 7. These frames are separated from one another by caoutchouc fittings, forming joints, one of which is shown upon its frame at Fig. 9, and by sheets of paper of about the same size as the outside size of the frame. These sheets have round holes made in them corresponding with those in the frames and fittings. To close exteriorly the two frames of the ends No. 1 and No. 10, the sheets of zinc $a\,a\,b\,b$ are substituted for the sheets of paper. All the frames are held together by iron stays $c\,c\,d\,d$, Figs. 4 and 6, and bolts $e\,e\,e\,e$. By tightening the bolts by nuts the caoutchouc fittings support the sheets of paper and form hermetic joints between all the frames. The frames being thus united, the four holes A B C D, Fig. 7, communicate from one frame to another, and form four horizontal conduits, A A' B B' C C' D D', throughout the length of the apparatus. The iron stay $c\,c$ is furnished with two pipes, E and F, corresponding with the two upper conduits, A A' B B', and the stay $d\,d$ carries two similar pipes, G H, corresponding with the two lower conduits, C C' D D', and a smaller pipe, $h$, corresponding with the conduit A A'. The interior of the odd numbers of the frames is in communication at the upper part with the conduit A A' and at bottom with the conduit D D' through holes $i\,i\,i$, bored in the thickness of the wood. These frames do not communicate with the conduits B B' or C C'. The interior of the even numbers of the frames communicates in a similar manner through holes $o\,o\,o$ with the conduits B B' and C C', and do not communicate with A A' or D D'. If, then, water or the less dense of two liquids is admitted through the tap I into the conduit A A' it will fill all the frames odd in number, while the displaced air will escape through the pipes $h$ and $g$. The frames full, the liquid will flow out through the siphon J, passing along the conduit D D', which communicates with those frames.

Figure 5:
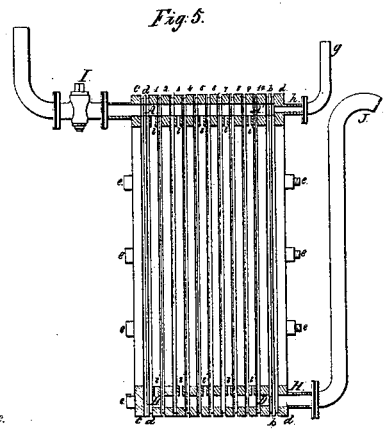
Figure 8:
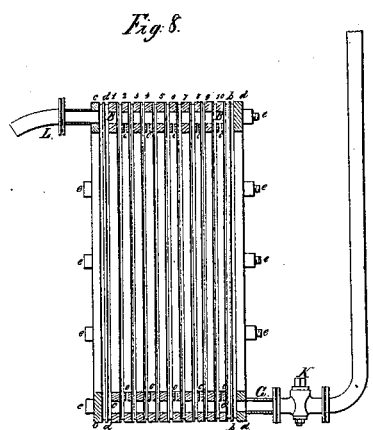

Fig. 5 is a section of the apparatus through the broken lines M N O P, Fig. 1, indicating the circulation of the liquid by a blue tint. The denser liquid, on the contrary, enters at bottom by the conduit C C' through the tap K, and fills all the frames even in number, and when full the liquid flows out through the pipe L, passing along the conduit B B', which communicates with all these frames. The circulation of the denser liquid (represented by a pink tint) is shown at Fig. 8, a section of the apparatus through the line Q R S T. The sheets of paper are all placed between two cloths pierced with corresponding holes. By the tightening these cloths are all held as well as the paper by the joints, and as they stretch on becoming wet they keep the sheets of paper in a vertical plane, and at the same time prevent their bursting by the pressure. Instead of cloth, perforated metal plates may be used. The frames though described as made of wood may be of metal. They may also be made of caoutchouc, and then the caoutchouc fittings may be dispensed with and other material may be used for the fittings provided that upon being tightened up it forms a close joint.

I have hereinbefore explained the analytical effect which takes place on placing in the osmogene apparatus impure molasses, sirups, or saccharine juices in opposition with water. The molasses which refuses to crystallize is rendered partially crystallizable by being passed once or twice through the osmogene, each time of being so passed the density may be reduced to 20° or 25° Baumé. The exosmos waters, which hold the salts being concentrated, are capable of furnishing crystallization of salts, in which niter and chloride of potassium generally predominate. When molasses thus treated has furnished a crystallization of sugar, the molasses which runs off may be again osmosed, clarified, and rendered crystallizable, and so on. When molasses purified by several osmotic treatments is placed in the osmogene, sugar in its turn may be eliminated and separated by oxosmose, then the osmotic analysis first indicated is reversed, the oxosmose waters coming out at 7° or 8° density are capable of being concentrated, of yielding abundant crystallization of sugar; and, finally, there remains in the osmogene a product non-crystallizable and richer in extractive matter. Osmosed molasses boiled with lime in excess and treated with carbonic acid are highly decolorized and purified. This is a simple means of removing from osmosed molasses the coloring principle; but this process does not exclude the employment of animal charcoal.

This osmogene apparatus may also be usefully employed for the following purpose: The saccharification of amylaceous substances by acids, whether for glucose matters or for the manufacture of alcohols, is carried on with more perfection below than above the temperature of 212° Fahrenheit, and the more the temperature is lowered the longer should the duration of the action be prolonged, or the proportion of acid be increased. The last method is the most simple, but it is not economical if the acid is to be lost, as usually is the case. The osmogene apparatus removes this difficulty. If a sirup of fecula, with all its acid, whatever be the proportion, be put into osmose, the acid will pass into the oxosmos water to the exclusion of the glucose matter. The acid may thus be employed indifinitely, and as it re-enters into work, under circumstances in which the glucose matter is not affected no evil would result if the eliminated acid took a certain proportion of glucose matter with it. In some cases I employ as the membrane paper artificial parchment, paper covered with leaf or powdered metal, or with varnish, collodion, or other coating, close cloths of linen, hemp, or cotton transformed into membrane by sulphuric acid, collodion, coagulated albumen, or other coatings, plates, or vessels of porous earths, skins, parchment, bladder, and all tissues or membranes of vegetable or animal origin.

Having now described the nature of the said invention and in what manner the same is to be performed, I declare that I claim—

1. The employment or adaptation, as hereinbefore described, of the phenomenon of endosmose for the treatment of molasses, sirups, saccharine juices, and other products.

2. Constructing apparatus in which the said treatment takes place substantially as hereinbefore described.

In testimony whereof I have signed my name to this specification before two subscribing witnesses.

DUBRUNFAUT.

Witnesses:
 CH. ARMGARD,
 J. W. BROOKS.